Patented Dec. 7, 1937

2,101,262

UNITED STATES PATENT OFFICE 2,101,262

CELLULOSE ETHERIFICATION

Robert W. Maxwell, Wilmington, Del., assignor to E. I. du Pont de Nemours & Company, Wilmington, Del., a corporation of Delaware No Drawing. Application February 23, 1935, Serial No. 7,850

12 Claims. (Cl. 260—152)

This invention relates to a process for the preparation of cellulose ethers, and more particularly to a process for the preparation of alkyl ethers of a low degree of substitution, and still more particularly to a process for the preparation of lower alkyl ethers soluble in dilute caustic soda solution.

Such ethers have hitherto been prepared by the action of water-insoluble alkylating agents such as dimethyl or diethyl sulfate or ethyl or methyl chloride on alkali cellulose at ordinary or elevated temperatures.

The caustic soluble cellulose alkyl ethers made by these previously used methods are characterized by their lack of uniformity and high content of insoluble material which makes them difficult of filtration. A relatively high degree of substitution has been necessary to keep insoluble material at a minimum. The non-uniformity of the material causes solutions prepared by dissolving below 0° C. to gel readily at higher temperatures. Solutions of the ethers are cloudy and give films which are hazy, fragile in the coagulating bath, and of low wet strength. Furthermore, the process itself is inconvenient and even hazardous. The use of methyl sulfate is dangerous and involves elaborate safety precautions. Agents such as methyl and ethyl chloride must be used in pressure vessels which are inconvenient and expensive.

This invention has as an object the preparation of alkyl ethers of a low degree of substitution, i. e., containing up to one mol. of substituent per glucose unit of the cellulose, particularly those soluble in cold sodium hydroxide solution, of a high degree of uniformity. A still further object is the preparation of caustic soluble alkyl celluloses of a lower degree of substitution than have hitherto been prepared. A still further object is a simplified procedure for the preparation of cellulose alkyl ethers.

These objects are accomplished by the following invention wherein cellulose is alkylated with a solution of an alkylating agent substantially consisting of an alkali metal lower alkyl salt of acid such as sodium methylsulfate, until up to one mol. of alkyl per glucose unit of the cellulose is introduced.

Although it has been proposed to use sodium alkyl sulfates for the etherification of cellulose, their application has been restricted to the preparation of water soluble ethyl cellulose with sodium ethylsulfate in combination with diethyl sulfate or to the preparation of ethyl cellulose soluble in organic solvents, by treating an already ethylated cellulose with sodium ethylsulfate, or by the treatment of dry alkali cellulose with dry alkali alkyl sulfate. For these purposes they are extremely unsatisfactory. Thus, in an experiment using 16 mols of sodium ethylsulfate with one mol (glucose unit) of alkali cellulose containing 17 mols of sodium hydroxide and 10 mols of water of 150° C. for 16 hours, a highly degraded ethyl cellulose containing 25% ethoxyl was obtained, although by using ethyl chloride it was possible to prepare a high viscosity (therefore only slightly degraded) organic solvent soluble ethyl cellulose containing 44% ethoxyl with much less reagent in a considerably shorter time. It was therefore an occasion for surprise when it was discovered that solutions of the salts of alkyl sulfuric acids such as methyl- and ethylsulfuric acids are remarkably good etherifying agents for the preparation of low substituted caustic soluble cellulose ethers.

Having outlined above the general principles and purposes of the invention, the following exemplifications thereof wherein all parts are by weight have been added for purposes of illustration and not in limitation:

Example 1

Eighty parts of sulfite wood cellulose in sheet form are steeped in a mixture of 400 parts of 21% sodium hydroxide solution in which has been dissolved 102 parts of sodium methylsulfate. After one-half hour the sheets are pressed to 216 parts. The sheets are then stored in a closed vessel at 30° C. for 96 hours. The product, after purification by washing with tepid water in a beater, is dissolved to give 5% cellulose and 7% sodium hydroxide at −8° C. The solution is viscous, stable and clear. It filters a great deal better and is much stronger in acid film casting baths than a product of the same viscosity and methyl content (3.45%) prepard from the same cellulose with dimethyl sulfate.

Example 2

The procedure is the same as in Example 1 except that the freshly pressed sheets are stored in an atmosphere of nitrogen for 10 days. The product is much more viscous than the product of Example 1 but is of the same degree of solubility. Solutions of the product cast to films of considerably higher wet strength than methyl cellulose of the same viscosity and methyl content prepared from the same cellulose using other methylating agents.

Example 3

The procedure is the same as in Example 1 except that the pressed sheets are aged for 65° for 20 hours. The product resembles that of Example 1 closely. If the sheets are aged in an atmosphere of nitrogen, they resemble the product of Example 2. In either case the ethers show a markedly decreased tendency to gel compared with products of the same viscosity and methyl content prepared with the same cellulose and conventional methylating agents.

Example 4

The procedure is the same as in Example 1 except that the freshly pressed sheets are disintegrated in a shredder before aging. The product, containing 3.45% methoxyl, is of lower viscosity than that from Example 1 but contains only a trace of insoluble material.

Example 5

Eighty parts of sulfite wood cellulose in sheet form are steeped in a mixture of 420 parts of 21% sodium hydroxide with 180 parts of sodium methylsulfate. After one-half hour the product is pressed to 200 parts and aged for 120 hours at 30°. The product is purified by washing in a beater and without drying is dissolved at —10° C. to a solution containing 7% cellulose and 7% sodium hydroxide. The mixture is stirred vigorously while warming to room temperature in a mixer of the Vissolver type. A high viscosity solution is obtained which is clearer, filters much better and casts to films of better wet strength than methyl celluloses of equal methyl contents prepared by the methods of the prior art.

Example 6

The procedure is the same as in Example 1 except that 0.25% of sodium salts of acids prepared from primary branch chain alcohols of 6 to 8 carbon content prepared e. g., by the process of Reid U. S. Patent 1,856,263, synthetically by the reduction of carbon monoxide under pressure are used in the steeping caustic. The product, containing 3.45% methoxyl, is of still better solubility than the product of Example 1. The above mixture may be replaced with 0.25% of a 75% cresol, 25% butyl cellosolve mixture with the same results.

Example 7

The procedure is the same as in Example 5 except that after aging the sheets are dried rapidly at 65° and stored until needed. The product decreases in viscosity only slightly with time and gives solutions of excellent solubility.

Example 8

Eighty parts of sulfite wood cellulose in sheet form are steeped in a mixture of 420 parts of 21% sodium hydroxide with 180 parts of sodium methylsulfate. After one-half hour the product is pressed to 320 parts and allowed to age at 30° for eight days. The product after purification dissolves readily in 9% caustic at room temperature with only a small quantity of fiber. On cooling to 0° all but a trace of insoluble material dissolves. The ether is of very much better solubility than products of the same viscosity and methyl content from sulfite pulp and the usual methylating agents.

Example 9

The procedure is the same as in Example 1 except that high alpha cellulose is used. The product differs only slightly from that of Example 1, but the steeping liquor becomes much less contaminated with hemicellulose which facilitates the steeping of subsequent batches.

Example 10

The procedure is the same as in Example 1 except that a solution of 51 parts of sodium methylsulfate in 400 parts of 21% sodium hydroxide is used as a steeping liquor. The product when dissolved to 5% cellulose in 9% sodium hydroxide at —10° contains some fiber but is of decidedly better solubility than methyl cellulose solutions of the same viscosity and methyl content prepared from sulfite pulp with the usual methylating agents.

Example 11

Eighty parts of wood cellulose in sheet form are steeped in a mixture of 400 parts of 21% sodium hydroxide and 112 parts of sodium ethylsulfate. After one-half hour the sheets are pressed to 220 parts and are heated for 48 hours in a nitrogen atmosphere at 65°. After purification the product is soluble in 9% sodium hydroxide at —15° C. to give clear, moderately viscous solutions.

Example 12

Eighty parts of wood cellulose in sheet form are steeped in a mixture of 400 parts of 21% sodium hydroxide solution, 51 parts of sodium methylsulfate and 56 parts of sodium ethylsulfate. After one-half hour the sheets are pressed to 218 parts and are heated at 65° in a nitrogen atmosphere for 36 hours. The product when purified dissolves to clear, viscous solutions at —10° in 8% sodium hydroxide. Films cast from the solution are unusually clear.

Example 13

Cotton broadcloth is run continuously through a bath consisting of 480 parts of 18% sodium hydroxide solution, 102 parts of sodium methylsulfate and 0.25 parts of sodium salts of acids prepared from primary branch chain alcohols of 6–8 carbon content prepared synthetically by reduction of carbon monoxide under pressure. The impregnated cloth is squeezed between wringer rolls to 3.3 times its original weight, wound in rolls and allowed to stand for 48 hours at 30°, preferably in a nitrogen atmosphere. The product is then washed caustic free. The cloth has acquired a permanently sized effect and shows an increased affinity for direct dyes.

Example 14

The procedure is the same as in Example 13 except that the caustic used is of the highest electrolytic grade. The product shows considerably less degradation than the product of Example 13.

Example 15

Cellulose in roll or sheet form is run continuously through a bath containing 480 parts of 18% sodium hydroxide and 102 parts of sodium methylsulfate. The steeped material is run through squeeze rolls which reduce the weight to 3.34 times that of the original pulp. The product is stored for 96 hours at 30° and is then purified by washing in a beater. The product resembles that of Example 1 closely.

Example 16

The freshly pressed steeped material of Example 15 is stored indefinitely in an atmosphere of nitrogen until needed. It shows only a slight reduction in viscosity even on long standing.

Example 17

Two hundred parts of 98% sulfuric acid are mixed with 100 parts of absolute methanol without cooling. After standing one-half hour the product is neutralized with 20% sodium hydroxide solution. The resulting mixture is evaporated to 620 parts, the liquor decanted from separated crystals and mixed with a solution of 170 parts of sodium hydroxide in 130 parts of water. The mixture is cooled and then are added 5 parts of a 35% solution of sodium salts of acids prepared from primary branch chain alcohols of 6-8 carbon content prepared by reduction of carbon monoxide under pressure. In the liquor are steeped 150 parts of wood cellulose in sheet form for 20 minutes. The sheets are then pressed to 405 parts and stored in an atmosphere of nitrogen for 21 hours at 65°. The product after purification by washing out of salts and excess caustic with water at 25° C., dissolves at 10° C. in 6% sodium hydroxide to give a highly viscous solution containing some fiber. On cooling to —10° all fiber disappears and the resulting solution filters perfectly.

Example 18

One hundred sixty-two parts of bulk cellulose are placed in a press cylinder with a mixture of 324 parts of 23% sodium hydroxide and 67 parts of sodium methylsulfate. Pressure is applied slowly until free liquor appears. The pressure is released and reapplied several times to insure complete penetration of the alkylating mixture. The press cake is stored at 30° for 120 hours. The product after purification dissolves to give a clear, easily filtered syrup when cooled with 8% sodium hydroxide solution to —10°. This variation of the process is especially suited for the use of regenerated cellulose. The pressed unpurified cake can be stored and used without purification or appreciable loss in viscosity if protected from free contact with air.

Example 19

Eighty parts of sulfite pulp in sheet form are steeped in a mixture of 400 parts of 12% sodium hydroxide with 102 parts of sodium methylsulfate. After one-half hour the sheets are pressed to 216 parts. The product is heated at 30° for 120 hours after which it is purified by washing in a beater with water. The ether is insoluble in caustic but is suitable for further reactions such as esterification or xanthation.

Example 20

Eighty parts of cotton cellulose in sheet form are steeped in a mixture of 800 parts of 45% sodium hydroxide with 204 parts of sodium methylsulfate for 30 minutes. The sheets are then pressed to 352 parts and aged 72 hours at 30°. The product after purification by washing with water is soluble in 9% sodium hydroxide solution at 15° C. The solubility is very much better than that of products of the same viscosity and methyl content prepared from the same cellulose with other methylating agents.

It is preferable to keep the temperature of the steeping caustic below 15° to minimize saponification of the sodium methylsulfate.

Example 21

One hundred sixty-two parts of wood cellulose are steeped in an aqueous 18% sodium hydroxide solution for one hour and then pressed to 400 parts. The pressed sheets are run rapidly through squeeze rolls which are covered with a spongy material saturated with a 45% aqueous solution of sodium methylsulfate. The pressure on the rolls and the quantity of sodium methylsulfate on the rolls is so adjusted that 147 parts of the sodium methylsulfate solution are taken up by the alkali cellulose. The sheets are set aside to age for five days at 30° and are then purified and the product dried. It gives a high viscosity solution in 7% sodium hydroxide when cooled to —10° which filters much more readily than a product of the same degree of substitution and viscosity made from the same cellulose with the usual methylating agents.

Example 22

One hundred sixty-two parts of wood cellulose in sheet form are steeped in 18% sodium hydroxide solution for two hours. The sheets are then pressed to 400 parts and placed in a shredder. During the shredding operation 134 parts of sodium methylsulfate in anhydrous form are added slowly. Shredding is continued for six hours. The product is aged at 30° for 96 hours in an atmosphere of nitrogen. It gives a high viscosity solution when dissolved in 7% sodium hydroxide at 0° C.

Example 23

One hundred sixty-two parts of cellulose in sheet form are steeped in 35% sodium hydroxide solution for two hours. The sheets are pressed to 500 parts and mixed in a shredder with 268 parts of sodium methylsulfate for four hours at 25°. The temperature of the shredder is then raised to 80° and shredding continued for 24 hours. The product gives a solution of good viscosity and excellent solubility in 6% sodium hydroxide at room temperature.

Example 24

Eighty parts of cellulose in sheet form are steeped in 18% sodium hydroxide solution and pressed to 240 parts. The pressed sheets are mixed in a shredder with 96 parts of sodium ethoxyethylsulfate. After four hours the mixture is removed and heated in a nitrogen atmosphere for 48 hours at 80°. The resulting product after purification dissolves in 9% soduim hydroxide on cooling to —10° to give moderately viscous solutions which can be cast in acid baths to clear flexible films.

Example 25

Eighty parts of cellulose in sheet form are steeped in 18% sodium hydroxide solution and pressed to 240 parts. The pressed sheets are mixed in a shredder with 89 parts of sodium methoxyethylsulfate. After four hours the mixture is removed and heated in a nitrogen atmosphere for 24 hours at 65° C. After purification the resulting ether dissolves in 8% aqueous sodium hydroxide when cooled to —10° C. to give highly viscous solutions much resembling caustic soluble methyl celluloses.

In carrying out the invention all types of cellulose or its conversion products such as oxycellulose, alkali cellulose, cellulose hydrates, regenerated cellulose or cellulose in woven or spun form may be used. The cellulose should preferably be as little depolymerized as possible so that a long time of aging or reaction can be used, but this is not absolutely necessary since the aging can be inhibited by the exclusion of air.

As alkylating agents sodium methylsulfate and sodium ethylsulfate may be used. Sodium methylsulfate gives much better results than sodium ethylsulfate. The higher alkylsulfates such as sodium isobutylsulfate and sodium laurylsulfate are only slightly effective. Sodium methoxyethylsulfate and sodium ethoxyethylsulfate, however, give satisfactory results. The higher alkyl sulfuric acid salts give ethers which are water repellent or show changed affinities for dyes. The sodium salts of the lower alkyl sulfuric acid salts are most convenient to use, but other soluble metal lower alkyl sulfates in general such as the potassium, calcium, barium, etc., or other alkali or alkaline earth methyl or ethylsulfates may be used.

The reaction may be carried out in numerous variations. The preferred process includes the solution of the alkylating agent in the steeping caustic for this gives very uniform distribution of the reagent. The cellulose is placed in the liquor until thoroughly impregnated, pressed to such a weight that it contains the proper quantity of alkylating agent and caustic and then set aside to age and react. For 100 parts of cellulose taken the weight of the pressed material is 200 to 500 parts, preferably 300 to 400 parts. The preferred range of alkali concentration is 15% to 21% to which is added 10% to 25% of the alkali alkylsulfate. Above 21% caustic concentration the alkali solubility of the cellulose ether product is not as good as that produced using caustic alkali solutions in the range of 15% to 21%. Ethers prepared using a caustic concentration of 8% to 15% to which is added up to 10% of the alkali alkylsulfate are in general alkali insoluble. The densely pressed material may be disintegrated in a suitable apparatus such as a shredder if desired, but this accelerates the aging without increasing the speed of the reaction. If the press cake is sufficiently dense, penetration of air is slight and viscosity reduction on standing is negligible. Therefore, the press cake can be stored as a finished stable product. If it is desired to purify the ether this may be accomplished by washing out the excess caustic and salts with lukewarm or acidulated water in a suitable apparatus such as a beater. The by-product salts reduce the solubility of the product, and to obtain the best solution these should be removed.

The products may be used as starting materials in the manufacture of cellulose ethers and esters.

While it is preferable to use caustic soda as the alkali, soluble strong inorganic bases such as soluble caustic alkali or alkaline earth bases, are generally satisfactory. The preferred concentration for caustic soluble ethers is about 18%, although concentrations as low as 8% or as high as 50% may be used. In general, it is desirable to hold the quantity of alkali in the reaction mixture as low as possible without introducing a great excess of water. The improved products of the invention, however, are also obtained with higher water ratios but with somewhat greater consumption of reagent. Although the stability of the alkyl sulfuric acid salts in the presence of caustic is so great that loss of reagent due to saponification is negligible, with high caustic concentrations where the decomposition rate is highest it is sometimes desirable to keep the steeping liquor cool. The steeping liquor after fortification to the original strength may be reused. The temperature of the reaction may be varied from 0° to 150° C. or even higher depending upon the reactivity or solubility of the alkylsulfate salt or the rate of reaction desired. The use of wetting agents in the steeping mixture improves the uniformity of the cellulose ether considerably. In general, any wetting agent in caustic solution may be used, including the so-called "mercerizing assistants". Where very large quantities of salt are used, it is sometimes necessary to include some alcohol in the steeping mixture to reduce the quantity of water present to a minimum.

While the preferred process includes the use of the alkali alkyl sulfate in the steeping bath, the excess being pressed out, these salts may also be used in the usual etherification processes, the general conditions for the reaction being the same as those where the salt is dissolved in the steeping caustic. Alkali cellulose may be made by any of the known procedures and the alkali alkyl sulfate incorporated therewith in a shredder, edge runner, kneader, or other suitable mixer. The salt of the alkyl sulfuric acid may be added as a solid or in suspension in water or other organic liquid or as water solution or as a water-soluble solution. This procedure is especially applicable to the use of larger quantities of alkylating agent than can conveniently be dissolved in the steeping caustic. Furthermore, alkali cellulose in sheet form may be impregnated with a water or alcohol-water solution of the alkali alkyl sulfate etherifying agent in a suitable way. The cellulose may also be steeped in a sodium alkyl sulfate solution, either in water or aqueous alcohol and then mixed with an aqueous or aqueous alcoholic solution of caustic in a shredder or other type mixer.

The sodium alkyl sulfates may be used either in pure or crude form. Thus, the reaction mixture obtained by the action of methanol on concentrated sulfuric acid, is when neutralized, practically as efficient as the pure material, due allowance being made for the by-product sulfate content.

The superior alkylating effect of the lower alkyl sodium sulfates seems to be connected with their solubility in water or aqueous caustic. In the treatment of cellulose with water insoluble reagents such as those of the prior art, the reagent penetrates the interior of the fiber with considerable difficulty and the reaction takes place on the exterior of the fiber to a much greater extent than on the interior. With a water soluble material such as sodium methylsulfate the reagent penetrates the alkali cellulose readily giving equal etherification throughout the whole fiber. The basic uniformity of the product of the present invention lies therefore in the uniform etherification of the individual fiber as distinguished from the uniform etherification of the mass as a whole. In this latter type each fiber receives the same quantity of reagent as every other fiber but each portion of the fiber does not receive the same amount as every other portion. The use of sodium methylsulfate and the other alkyl alkali sulfates as outlined in the present invention permits the attainment of both types of uniformity of etherification.

The inefficiency of the alkyl sulfuric acid salts as etherifying agents for higher substituted cellulose ethers is probably likewise due to their water solubility. As etherification progresses the cellulose becomes water repellent and less wet by aqueous alkali although more so by organic solvents and the usual alkylating agents. The water soluble alkylating agents are therefore repelled but the organic solvent soluble alkylating agents become more efficient. Although higher substituted methyl celluloses are water soluble, sufficiently high degrees of substitution to give organic solvent solubility are difficult of attainment even with sodium methylsulfate because water soluble methyl cellulose is repellent to caustic solutions.

The primary advantage of the invention lies in the increased uniformity of product. Improved uniformity manifests itself in improved solubility and ease of filtration, clarity of solutions, stability of solutions toward gelation and greater strength of films in acid casting baths and of the finished film when wet. With more uniform placement of methyl groups a lower degree of substitution is sufficient to attain solubility. The invention therefore, permits the preparation of soluble products of a lower degree of substitution than have been prepared heretofore. A secondary advantage lies in simplification of process. Thus, the usual methylating agents, methyl chloride and dimethyl sulfate are both difficult to handle. Methyl chloride is a gas requiring pressure vessels for use and dimethyl sulfate is so toxic that elaborate precautions are necessary to prevent injury. Sodium methylsulfate however, is non-volatile and soluble in water or caustic solution and only a shredder is needed to incorporate it with the cellulose. The alkylation is reduced to an operation of extreme simplicity when the alkylating agent is dissolved in the steeping caustic, the only apparatus necessary for the reaction being a steeping press compared with at least a steeping press and pressure reaction vessel or mixer by other processes.

The above description and examples are intended to be illustrative only. Any modification of or variation therefrom which conforms to the spirit of the invention is intended to be included within the scope of the claims.

I claim:

1. Process for the preparation of low substituted methyl cellulose, which comprises steeping 80 parts of cellulose in solid form in 400 parts of 21% sodium hydroxide solution to which has been added 102 parts of sodium methyl sulfate, for one-half hour, pressing the steeped cellulose to a weight of 216 parts, maintaining the same for 96 hours at 30° C. and washing with tepid water.

2. Process of claim 1 wherein the steeping caustic contains 0.25% of sodium salts of acids prepared by the oxidation of primary branch chain 6–8 carbon alcohols obtained by the catalytic hydrogenation of carbon monoxide.

3. A uniform low substituted methyl cellulose containing up to one methyl group per glucose unit obtainable by steeping cellulose in the form of a solid in an aqueous caustic alkali solution of an alkali metal methyl sulfate pressing off the excess of the steeping solution to leave in the press cake the amount of water, alkali and methylating agent required for the subsequent etherification, said methylating agent being present in an amount of ⅛ to 2 mols per glucose unit of cellulose, allowing the reaction to proceed in the press cake until up to one methyl group per glucose unit has been introduced.

4. A uniform low substituted ethyl cellulose containing up to one ethyl group per glucose unit obtainable by steeping cellulose in the form of a solid in an acqueous caustic alkali solution of an alkali metal ethyl sulfate pressing off the excess of the steeping solution to leave in the press cake the amount of water, alkali and ethylating agent required for the subsequent etherification, said ethylating agent being present in an amount of ⅛ to 2 mols per glucose unit of cellulose, allowing the reaction to proceed in the press cake until up to one ethyl group per glucose unit has been introduced.

5. A uniform low substituted lower alkyl cellulose containing up to one alkyl group per glucose unit obtainable by steeping cellulose in the form of a solid in an aqueous caustic alkali solution of an alkali metal alkyl sulfate pressing off the excess of the steeping solution to leave in the press cake the amount of water, alkali and alkylating agent required for the subsequent etherification, said alkylating agent being present in an amount of ⅛ to 2 mols per glucose unit of cellulose, allowing the reaction to proceed in the press cake until up to one alkyl group per glucose unit has been introduced.

6. Process which comprises reacting cellulose in solid form in the presence of an alkali of 8% to 50% strength with an alkylation reagent comprising essentially from ⅛ to 2 mols. of an alkali metal alkyl sulfate wherein the alkyl group contains not more than two carbon atoms.

7. Process for the preparation of alkali-soluble low substituted alkyl cellulose which comprises steeping cellulose in the form of a solid in an aqueous caustic alkali solution of an alkali metal alkyl sulfate wherein the alkyl group contains not more than two carbon atoms, pressing off the excess of the steeping solution to leave in the press cake the amount of water, alkali and alkylating agent required for the subsequent etherification, allowing the reaction to proceed in the press cake until the reaction product becomes alkali-soluble and thereupon terminating the reaction.

8. Process which comprises reacting cellulose in solid form in the presence of an alkali with an ethylating reagent comprising essentially an aqueous solution of an alkali ethyl-sulfate and discontinuing the reaction when the product becomes soluble in cold alkai.

9. The process for the preparation of uniform undegraded low substituted methyl cellulose containing not more than one mol. of substitution per glucose unit of cellulose, which comprises steeping cellulose in solid form in an aqueous caustic alkali methylating bath containing sodium methyl sulfate as substantially the sole methylating agent, pressing off the steeping liquid to the extent that the weight of the press material is not more than 500 parts per 100 parts of cellulose, allowing the pressed material to stand and to react until the desired amount of substitution has been effected.

10. Process for the preparation of low substituted alkyl cellulose containing up to one mol. of substitution per glucose unit of cellulose which comprises preparing a cellulose etherification reaction mixture containing the reactants in the proportion required for the subsequent etherification and including, as the essential etherification agent, an aqueous solution of an alkali metal alkyl sulfate wherein the alkyl group contains not more than two carbon atoms, said alkali metal alkyl sulfate being present in amount of ⅛ to 2 mols per glucose unit of cellulose, allowing the reaction to proceed until up to one mol. of alkyl per glucose unit of the cellulose is introduced, and thereupon terminating the reaction.

11. Process for the preparation of low substituted methyl cellulose containing up to one mol. of substitution per glucose unit of cellulose, which comprises preparing a cellulose etherification reaction mixture containing the reactants in the proportion required for the subsequent etherification and including as the essential etherification agent an aqueous solution of an alkali metal methyl sulfate, said metal methyl sulfate being present in amount of 1/8 to 2 mols per glucose unit of cellulose, allowing the reaction to proceed until up to one mol. of methyl per glucose unit of the cellulose is introduced.

12. Process for the preparation of low substituted ethyl cellulose containing up to one mol. of substitution per glucose unit of cellulose, which comprises preparing a cellulose etherification reaction mixture containing the reactants in the proportion required for the subsequent etherification and including as the essential etherification agent an aqueous solution of an alkali metal ethyl sulfate, said alkali metal ethyl sulfate being present in amount of 1/8 to 2 mols per glucose unit of cellulose, allowing the reaction to proceed until up to one mol. of ethyl per glucose unit of the cellulose is introduced, and thereupon terminating the ethylation.

ROBERT W. MAXWELL.